United States Patent [19]

Yamanaka et al.

[11] 4,322,057
[45] Mar. 30, 1982

[54] ELECTROMAGNETICALLY OPERATED VALVE UNIT

[75] Inventors: Minoru Yamanaka; Hideo Haneda, both of Toyota; Masatoshi Katoh, Kariya; Mitsuyuki Suzuki, Gamagohri, all of Japan

[73] Assignee: Aisin Seiki Kabushiki Kaisha, Kariya, Japan

[21] Appl. No.: 139,396

[22] Filed: Apr. 11, 1980

[30] Foreign Application Priority Data

Apr. 13, 1979 [JP] Japan .................................. 54-45765

[51] Int. Cl.³ ............................................. F16K 31/06
[52] U.S. Cl. ..................................... 251/129; 251/141; 335/255; 335/278; 137/625.65
[58] Field of Search ................ 251/129, 141; 335/278, 335/255; 137/625.65

[56] References Cited

U.S. PATENT DOCUMENTS 3,245,651  4/1966  Erickson ........................... 251/129
3,422,850  1/1969  Caldwell ........................ 251/129 X Primary Examiner—Arnold Rosenthal
Attorney, Agent, or Firm—Oblon, Fisher, Spivak, McClelland & Maier

[57] ABSTRACT

In an electromagnetically operated valve unit, a stationary core and a spring loaded moving-core are coaxially arranged within an axial bore extending across a lateral plate member of magnetic material, and a U-shaped yoke member of magnetic material has a head portion engaged with the stationary core and a pair of longitudinal arms which are supported by the opposite ends of the lateral plate member and fastened to a bracket. The lateral plate member is formed at its opposite ends with a pair of arms which are engaged with each outer face of the respective arms of the yoke member to uniform a magnetic path of the solenoid coil across the cores, the lateral plate member and the yoke member.

2 Claims, 5 Drawing Figures

ELECTROMAGNETICALLY OPERATED VALVE UNIT

BACKGROUND OF THE INVENTION

The present invention relates to electromagnetically operated valve units, and more particularly to an improvement of an electromagnetically operated valve unit which includes a main body of non-magnetic material having a closed end and an open end, a cover member of non-magnetic material sealingly fitted to the open end of the main body through a lateral plate member of magnetic material, a solenoid coil wound around a bobbin and contained within the main body, a stationary core of magnetic material concentrically fixed within the bobbin, a moving-core axially movable within an axial bore extending coaxially with the stationary core through the lateral plate member, resilient means for biasing the moving-core in one direction, a valve assembly cooperating with the moving-core, a U-shaped yoke member having a head portion engaged with an extension of the stationary core extending from the closed end of the main body and a pair of longitudinal arms extending from the head portion along both sides of the main body, and a bracket coupled over the cover member and secured to the respective arms of the yoke member.

In such a conventional valve unit as described above, a magnetic path of the solenoid coil is formed across the respective cores, the yoke member and the lateral plate member to generate a linear attraction force acting on the moving-core upon energization of the solenoid coil. With an assembly of the valve unit, as shown in FIG. 5, a lateral plate member 16' merely engages at its opposite ends with a pair of longitudinal arms 21'b of a U-shaped yoke member 21'. When the arms 21'b of yoke member 21' are fastened by caulking 21'c to a bracket 22' in process of assembly of the valve unit, the respective arms 21'b are irregularly deflected in the outward direction. This causes undesired displacement of the respective arms 21'b of yoke member 21' relative to the lateral plate member 16' and results in decrease of the engagement area between the lateral plate member 16' and the yoke member 21'. As a result, the magnetic path of the solenoid coil decreases at the engaged portions of the lateral plate member 16' with the respective arms 21'b and changes in each product of the valve unit.

SUMMARY OF THE INVENTION

It is, therefore, the primary object of the present invention to provide an improved valve unit wherein the lateral plate member is firmly engaged with the respective arms of the yoke member without any undesired displacement in a simple construction to solve the above-noted drawbacks.

According to the present invention briefly summarized, the lateral plate member is formed at its opposite ends with a pair of arms which are engaged with each outer face of the longitudinal arms of the yoke member. Preferably, the lateral plate member is provided at the center thereof with an annular flange permitting axial movement of the moving-core, and the yoke member is provided at the head portion thereof with an annular flange supporting an extension of the stationary core thereon.

BRIEF DESCRIPTION OF THE DRAWINGS

Additional objects and advantages of the present invention will be more readily apparent from the following detailed description of a preferred embodiment thereof when taken together with the accompanying drawings, in which.

DESCRIPTION OF THE PREFERRED EMBODIMENT

Figure 1:
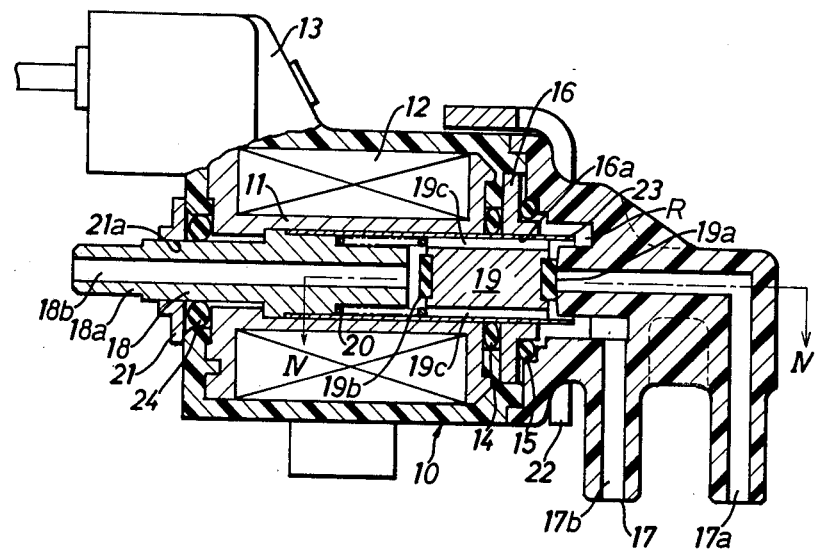
FIG. 1 is an elevational cross-sectional view of an electromagnetically operated valve unit in accordance with the present invention.
Figure 2:
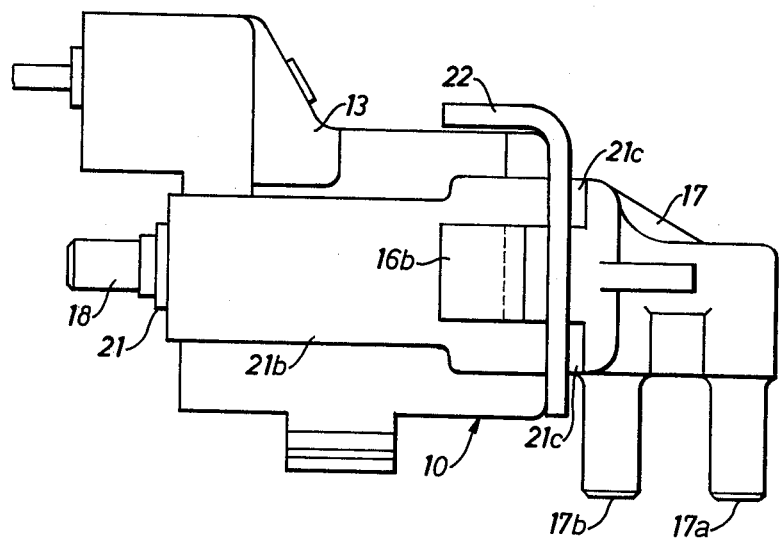
FIG. 2 is a side view of the valve unit.
Figure 3:
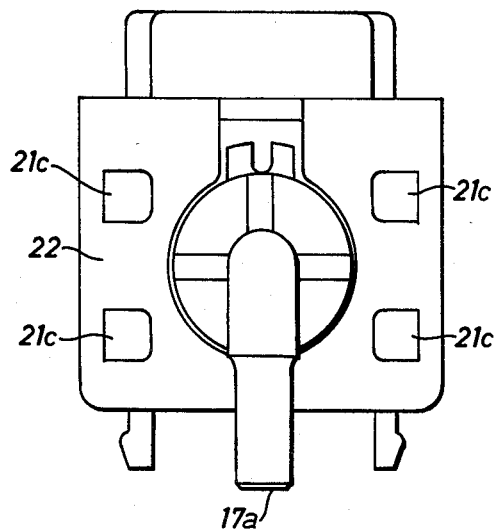
FIG. 3 is a front view of the valve unit.
Figure 4:
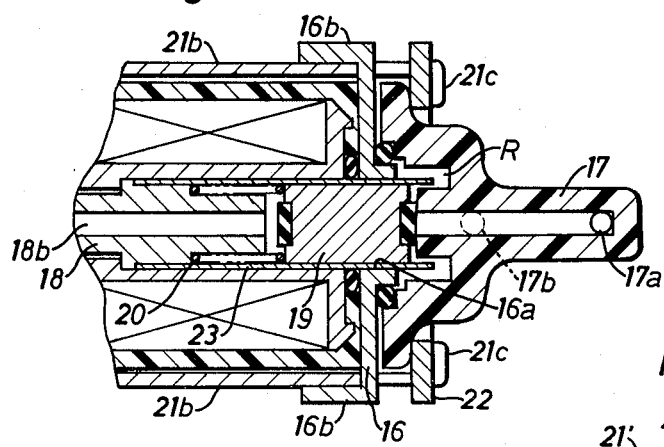
FIG. 4 is a transverse cross-sectional view of the valve unit.
Figure 5:
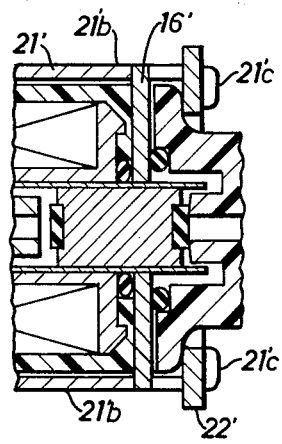
FIG. 5 is a transverse sectional view of prior art.

With reference to FIGS. 1 to 4 of the drawings, an electromagnetically operated valve unit of the present invention has a casing assembly 10 which includes a main body 13 of synthetic resin closed by a cover member 17 of synthetic resin at its open end. The main body 13 contains therein a solenoid coil 12 wound around a bobbin 11, and the cover member 17 is secured to the open end of main body 13 through a U-shaped lateral plate member 16 of magnetic material and a pair of annular seal members 14 and 15. The cover member 17 is formed with first and second ports 17a and 17b which are in open communication with a cavity chamber R in casing assembly 10. A stationary core 18, a moving-core 19 and a coil spring 20 are coaxially assembled within the casing assembly 10 in such a manner that a U-shaped yoke member 21 is fastened by caulking to a rectangular bracket 22 at its longitudinal arms thereby to complete the assembly of the valve unit.

The stationary core 18 is fixed to the inner circumference wall of bobbin 11 and extends outwardly at its left end 18a from the main body 13. The stationary core 18 is formed with a third port 18b in the form of an axial bore which communicates into the cavity chamber R in casing assembly 10. The moving-core 19 is axially slidable within a tubular member 23 of a sheet metal which is secured to the inner circumference wall of bobbin 11 coaxially with the stationary core 18 and extends through a central aperture 16a of plate member 16 into the cavity chamber R. The moving-core 19 is provided at its opposite ends with a pair of valve members 19a and 19b and at its outer circumference with a plurality of equidistantly spaced axial slots 19c. The coil spring 20 is received by an annular shoulder of stationary core 18 to bias the moving-core 19 toward the cover member 17.

The U-shaped yoke member 21 is made of magnetic material and is provided at its head portion with a central aperture 21a through which the left end 18a of stationary core 18 extends outwardly. As is clearly shown in FIGS. 2 and 4, the yoke member 21 has a pair of longitudinal arms 21b which extend in parallel along the both sides of casing assembly 10 toward the bracket 22. Each arm 21b is formed at its free end with a pair of claws 21c which are inwardly bent and fastened by caulking to the rectangular bracket 22, as can be well seen in FIG. 3. Thus, the yoke member 21 is engaged at its head portion with the closed end of casing assembly 10 through an annular seal member 24 and is fixed in position by caulking the respective claws 21c to the bracket 22.

In the above construction, the U-shaped lateral plate member 16 associates with the cores 18, 19 and yoke member 21 to form a magnetic path of solenoid coil 12. As can be well seen in FIG. 4, the lateral plate member 16 extends across the casing assembly 10 and respective arms 21b of yoke member 21. The opposite ends of plate member 16 are formed as a pair of arms 16b which are engaged with each outer face of the longitudinal arms 21b of yoke member 21. Furthermore, the central apertures 16a and 21a of lateral plate member 16 and yoke member 21 are respectively formed with an annular flange during burring process of them.

During deenergization of the solenoid coil 12, the valve member 19a of moving-core 19 closes the first port 17a due to biasing force of the coil spring 20, while the second port 17b is connected to the third port 18b through the cavity chamber R and the axial slots 19c of moving-core 19. When the solenoid coil 12 is energized by an electric current from an electric power source, a linear attraction force generates between cores 18 and 19 to displace the moving-core 19 against the biasing force of spring 20 in the leftward direction. Then, the third port 18b is closed by engagement with the valve member 19b of moving-core 19, while the second port 17b is connected to the first port 17a through the cavity chamber R.

When the yoke member 21 is fastened by caulking to the rectangular bracket 22 in process of assembly of the valve unit, the lateral plate member 16 serves to restrain outward deflection of the respective arms 21b of yoke member 21 at its both arms 16b and also serves to uniform and increase the magnetic path of solenoid coil 12 by firm engagement with the respective arms 21b of yoke member 21. As a result, any change or decrease of the linear attraction force does not occur in each product of the valve unit. Futhermore, the magnetic path of solenoid coil 12 increases due to the respective annular flanges of central apertures 16a and 21a of plate member 16 and yoke member 21. This serves to lower the voltage necessary for activating the valve unit in a simple construction.

Although the present invention has been illustrated and described in connection with a specific embodiment, various adaptation and modifications will become apparent to those skilled in the art from the description in conjunction with the appended claims without departing from the scope and spirit of the present invention.

What is claimed is:

1. In an electromagnetically operated valve unit comprising: a main body of non-magnetic material having a closed end and an open end; a cover member of non-magnetic material sealingly fitted to the open end of said main body; a lateral plate member of magnetic material interposed between said main body and said cover member; a solenoid coil wound around a bobbin and contained within said main body; a statinary core of magnetic material concentrically fixed within said bobbin; a moving-core axially movable within an axial bore extending coaxially with said stationary core through said lateral plate member; resilient means for biasing said moving-core toward said cover member; a valve assembly cooperating with said moving-core to control fluid flow passing therethrough; a U-shaped yoke member having a head portion engaged with an extension of the stationary core extending from the closed end of said main body and a pair of longitudinal arms extending from the head portion along both sides of said main body; and a bracket coupled over said cover member and secured to the respective arms of said yoke member;

the improvement wherein said lateral plate member is provided at its opposite ends with a pair of arms which are engaged with each outer face of the longitudinal arms of said yoke member.

2. An electromagnetically operated valve unit as claimed in claim 1, wherein said lateral plate member is provided at the center thereof with an annular flange permitting axial movement of said moving-core, and said yoke member is provided at the head portion thereof with an annular flange supporting an extension of said stationary core thereon.

* * * * *